UNITED STATES PATENT OFFICE.

FRIEDRICH WILHELM DAHNE, OF SWANSEA, GREAT BRITAIN.

IMPROVEMENT IN EXTRACTING COPPER FROM ORES.

Specification forming part of Letters Patent No. 35,509, dated June 10, 1862.

*To all whom it may concern:*

Be it known that I, FRIEDRICH WILHELM DÄHNE, of Swansea, Glamorganshire, Great Britain, gentleman, have invented or discovered new and useful Improvements in Extracting Copper from Ores; and I, the said FRIEDRICH WILHELM DÄHNE, do hereby declare the nature of the said invention and in what manner the same is to be performed to be particularly described and ascertained in and by the following statement thereof—that is to say:

My invention consists in improved methods of extracting copper from ores containing more or less sulphur, either in the raw state, or with the sulphur partially expelled, as in burnt ores, or after treatment for other purposes in chemical works, as well as from ores containing copper in a metallic state or oxidized.

To facilitate the processes which it is to undergo, the ore is first to be pulverized, if it has not already been reduced by grinding, stamping, or otherwise, and if it contains sulphur this is to be expelled by dead calcination. If the ore has not contained slate as gangue, or been otherwise mixed up with large quantities of alumina, it is to be mixed with about eight per cent. of sulphate of iron and subjected to a short process of calcining at a dull low-red heat until the sulphate of iron is decomposed into peroxide of iron, the sulphuric acid combining with the copper, instead of with the iron, as sulphate of copper. The ore, now taken from the furnace, is allowed to cool, and is then lixiviated with hot or cold water, which will extract nearly all the soluble salts of copper. In case of an imperfect result in the operation, the process of treatment with sulphate of iron may be repeated. In many cases, especially when the ore is a clean iron pyrites, the leavings, after washing out the copper, will form a most valuable material for the iron-furnace, as the ore loses nearly all its sulphur particles. The precipitation of the copper is effected by any of the known methods.

I would remark that I am aware that it has before been proposed to treat copper ores with a solution of sulphate of iron. I do not therefore claim generally the treatment of copper ores with sulphate of iron; but I do claim—

The roasting a mixture of copper ore with sulphate of iron, so as to convert the copper into sulphate and the iron into peroxide, and then separating the sulphate of copper by lixiviation, as hereinbefore described.

FRIEDRICH WILHELM DÄHNE.

Witnesses:
   EDW. STRICK,
      *Solr., Swansea.*
   WM. WATKINS,
*Clerk to Mr. Tripp, Solicitor and Notary, Swansea.*